Patented Dec. 1, 1936

2,062,458

UNITED STATES PATENT OFFICE 2,062,458

MANUFACTURE OF PY-3-HYDROXYTETRA-HYDROHYDROXYNAPHTHOQUINOLINES

Hans Lange, Dessau-in-Anhalt, and Johann H. Helberger, Cologne-Mulheim, Germany, assignors to General Aniline Works, Inc., New York, N. Y., a corporation of Delaware No Drawing. Application September 13, 1935, Serial No. 40,408. In Germany February 20, 1935

9 Claims. (Cl. 260—40)

The present invention relates to a process for manufacturing py-3-hydroxytetrahydrohydroxynaphthoquinolines which corresponds to the general formula

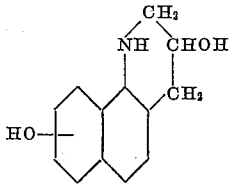

and to the new products obtainable by this process.

We have found that aminohydroxynaphthalenes of the formula

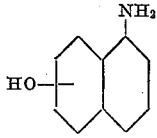

may be connected into the py-3-hydroxytetrahydrohydroxynaphthoquinolines of the formula given above by heating them with epichlorhydrin in the presence of an organic solvent to a higher temperature.

In view of the slight stability of the aminohydroxynaphthalenes used as starting materials, which partly are very easily oxidizable compounds, the said course of the reaction could not be foreseen. Preferably, the reaction is carried out in the presence of an indifferent gas in order to avoid oxidation.

As solvents, there may be used, for instance, chlorobenzene, xylene, or dioxane or mixtures of these solvents having a boiling point between 100 to 150° C. Preferably, however, we use as a solvent a higher aliphatic alcohol such as butyl, amyl, or hexylalcohol. The reaction temperature may be varied within wide limits, a higher temperature than about 150° C. is, however, not necessitated for carrying out the condensation.

The new end products are valuable parent materials for the manufacture of azo dyes, in particular dyes for acetate silk.

The following examples serve to illustrate our invention without limiting it, the parts being by weight:—

*Example 1.*—160 parts of 1-amino-5-hydroxynaphthalene are slowly heated under reflux, while stirring, to about 75° C. together with 200 parts of n-butylalcohol and 110 parts of epichlorhydrin and kept at this temperature for 1½ hours. Then the mixture is heated to boiling and boiling is continued for 9 hours. Thereupon, the weakly colored crystalline mass is cooled to room temperature under an atmosphere of carbon dioxide. 250 parts of a mixture of ethyl alcohol and acetone in the ratio 1:1 are added while stirring and the crystals are filtered under suction. The crystals are washed with a small quantity of the same mixture or alcohol and acetone, with a small quantity of ether and dried. 130 parts of the nearly colorless hydrochloride of the py-3-hydroxytetrahydro-7-hydroxynaphthoquinoline of the formula

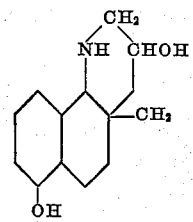

are obtained. The free base separated from the hydrochloride and recrystallized from dilute alcohol melts at 186 to 187° C.

*Example 2.*—160 parts of 1-amino-6-hydroxynaphthalene are heated under reflux, while stirring, in an hour together with 500 parts of amyl alcohol and 120 parts of epichlorhydrin to 125 to 130° C. The mixture is kept at this temperature for about 8 hours and then cooled. The separated crystals are filtered by suction and washed with acetone. 138 parts of the hydrochloride of the py-3-hydroxytetrahydro-8-hydroxynaphthoquinoline are obtained. The hydrochloride easily dissolves in water; the free base separated by addition of sodium acetate and recrystallized from dilute alcohol, melts at 206 to 207° C.

When substituting 1-amino-7-hydroxynaphthalene for the 1-amino-6-hydroxynaphthalene, the hydrochloride of the py-3-hydroxytetrahydro-9-hydroxynaphthoquinoline is obtainable in the same manner. The free base melts at 176 to 177° C.

*Example 3.*—163 parts of a moist paste of 1-amino-8-hydroxynaphthalene, having a dry content of 130 parts of the free base, freshly prepared by treating an aqueous solution of the hydrochloride of 1-amino-8-hydroxynaphthalene with sodium acetate, are dissolved in 300 parts of n-butylalcohol. Then 98 parts of epichlorhydrin are added and the whole is heated under reflux, while stirring, during 15 hours to about 120 to 125° C. After cooling, the separated crystals are filtered by suction and washed with butanol and acetone. 115 parts of py-3-hydroxytetrahydro-10-hydroxynaphthoquinoline hydrochloride are obtained. The free base, recrystallized from dilute alcohol, melts at 185° C.

What we claim is:—

1. The py-3-hydroxytetrahydrohydroxynaphthoquinolines of the general formula—

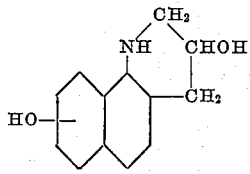

these bases being crystallized products which are insoluble in cold water, but soluble in dilute acids and alkalies.

2. The py-3-hydroxytetrahydro-7-hydroxynaphthoquinoline of the formula—

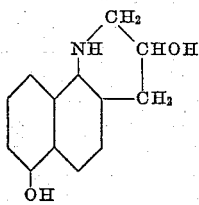

the free base recrystallized from dilute alcohol melting at 186 to 187° C.

3. The py-3-hydroxytetrahydro-8-hydroxynaphthoquinoline of the formula—

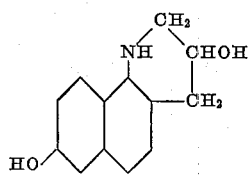

the free base recrystallized from dilute alcohol melting at 206 to 207° C.

4. The py-3-hydroxytetrahydro-10-hydroxynaphthoquinoline of the formula—

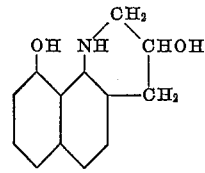

the free base recrystallized from dilute alcohol melting at 185° C.

5. The process which comprises condensing an aminohydroxynaphthalene of the general formula—

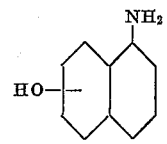

with epichlorhydrin.

6. The process which comprises condensing 1-amino-5-hydroxynaphthalene with epichlorhydrin.

7. The process which comprises condensing 1-amino-6-hydroxynaphthalene with epichlorhydrin.

8. The process which comprises condensing 1-amino-8-hydroxynaphthalene with epichlorhydrin.

9. The process which comprises heating an aminohydroxynaphthalene of the general formula—

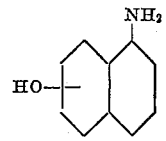

together with epichlorhydrin in the presence of an organic solvent to a temperature between 100 to 150° C.

HANS LANGE.
JOHANN H. HELBERGER.